United States Patent [19]

Boyce

[11] 4,332,273

[45] Jun. 1, 1982

[54] LEAKPROOF REFRIGERANT CONNECTOR

[76] Inventor: Harold L. Boyce, 7826 E. King St., Tulsa, Okla. 74115

[21] Appl. No.: 101,876

[22] Filed: Dec. 10, 1979

[51] Int. Cl.³ ............................................. F25B 45/00
[52] U.S. Cl. ................................. 137/322; 251/149.8; 62/292
[58] Field of Search ............... 251/149.4, 149.8, 149.9, 251/149.6; 137/322; 62/292, 299

[56] References Cited

U.S. PATENT DOCUMENTS

| | | | |
|---|---|---|---|
| 1,603,752 | 10/1926 | Ellis | 251/149.8 |
| 1,799,279 | 4/1931 | Butler | 251/149.8 X |
| 2,842,381 | 7/1958 | Franck | 251/149.4 |
| 2,968,497 | 1/1961 | Treleman | 251/149.4 |
| 3,645,496 | 2/1972 | Rawlins | 137/322 X |
| 3,706,318 | 12/1972 | Baniadam et al. | 251/149.4 X |
| 3,712,583 | 1/1973 | Martindale et al. | 251/149.4 |
| 4,002,186 | 1/1977 | Fink et al. | 251/149.4 |
| 4,017,057 | 4/1977 | Strybel | 251/149.4 |
| 4,069,686 | 1/1978 | Hoelman | 137/322 X |
| 4,193,419 | 3/1980 | Pellerito | 137/322 |

Primary Examiner—William R. Cline
Attorney, Agent, or Firm—Head & Johnson

[57] ABSTRACT

In combination with a valve having a biased opening mechanism; a connector for receiving fluid from said valve comprising: a connector body with a nut spaced there around; a cylinder; a tubing attached at one end thereof to the connector body and at a second end to the cylinder; an elongated spring extending through the connector body, tubing and into the cylinder; a piston spaced within the cylinder with a bore extending axially therethrough; and a mechanism to advance the piston against the spring which forces the spring against the valve opening mechanism which opens said valve.

4 Claims, 4 Drawing Figures

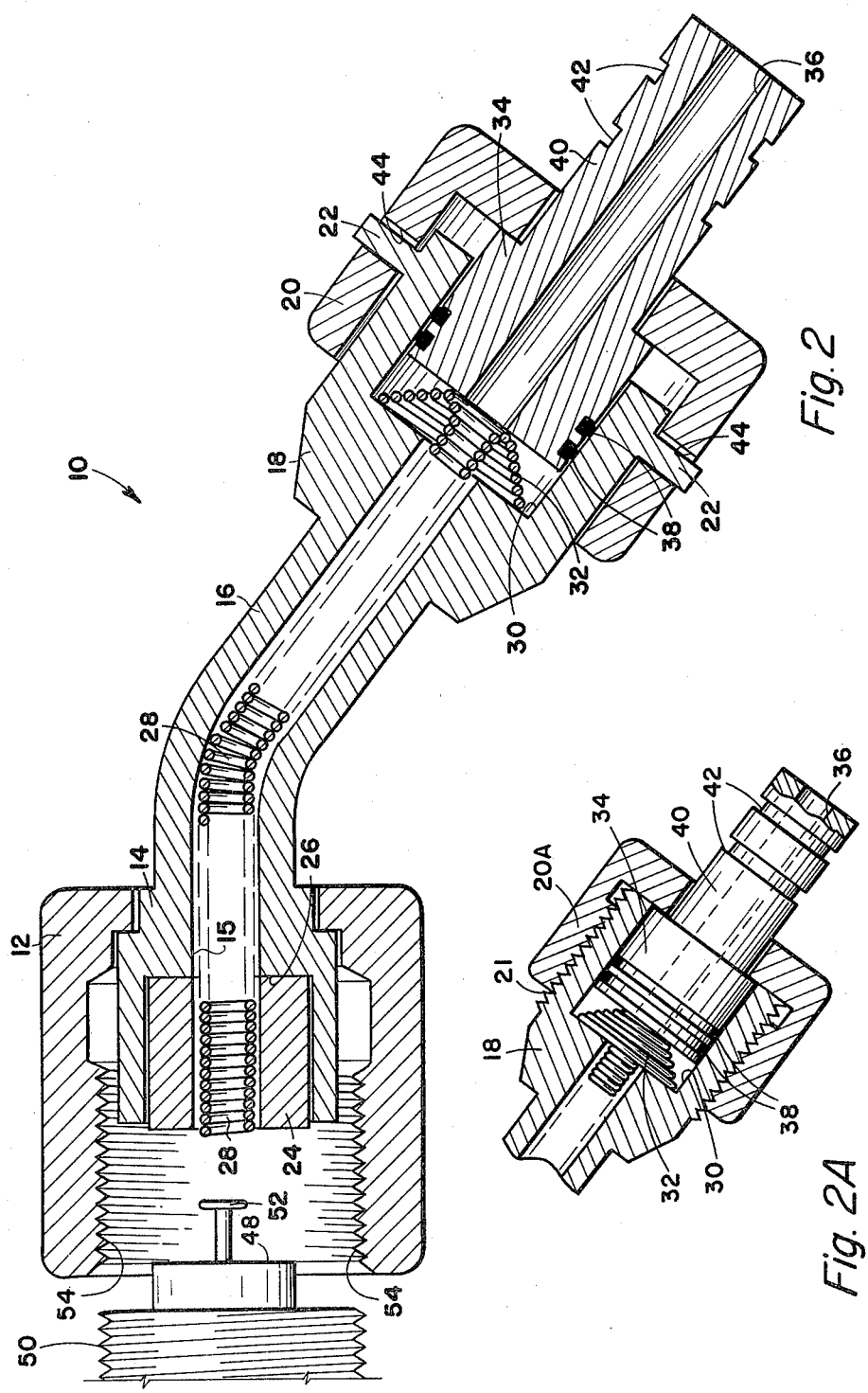

LEAKPROOF REFRIGERANT CONNECTOR

BACKGROUND OF THE INVENTION

1. Field of the Invention

The present invention relates to a leakproof refrigerant connector and, more particularly, to such a connector which is adapted to open a Schroeder-type core valve with minimal loss of refrigerant into the atmosphere.

2. Description of the Prior Art

Due to the concern for the destruction of the atmosphere caused by vapor refrigerants, such as, Freon, various types of connectors have been designed to prevent the escape of vapor from a refrigerant system. These refrigerant systems usually are provided with Schroeder-type valves which are well known in the prior art and are usually located in very inconvenient places. As a prior art connector was tightened on the Schroeder-type valve, a valve depressor touches the valve core first thereby allowing liquid from the high pressure side of the refrigerant system and vapor from the low pressure side to escape into the atmosphere before a seal is formed by the connector. Occasionally when the high pressure side connector is being removed, the liquid refrigerant causes moisture to freeze on the connector nut and threads making it difficult to remove. If the nut drags or sticks, the liquid sprays into the atmosphere and on the hands of the operator. Due to the very low temperature of the refrigerant, when the refrigerant touches the human flesh, it causes severe burns. If the nut freezes and cannot be turned, the refrigerant from the whole system may be lost into the atmosphere. If the nut does not freeze, only the liquid in the hose may be lost from the high pressure side and a small amount of vapor from the system will be lost from the low pressure side. No prior art refrigerant connectors has been designed to prevent the escape of refrigerant into the atmosphere and at the same time prevent burns from the refrigerant coming into contact with human flesh.

SUMMARY OF THE INVENTION

The present invention provides a connector which prevents the escape of fluid from a Schroeder-type core valve when being connected. The present invention also provides a safe connection which eliminates the possibility of the fluid contacting human flesh and the possibility of the connector freezing in an open position which would allow the escape of the fluid from the system.

The connector is used in combination with a valve having a biased opening mechanism. The connector has a connector body with a bore axially extending therethrough and a bushing mounted into a recess in a first face thereof. The body is attached to and in connection with a hollow tube which, in turn, is attached to and in communication with a cylinder. The cylinder has a bore axially extending therethrough and a recess portion in the end thereof. A piston with a bore axially extending therethrough is spaced within the recess portion of the cylinder. An elongated spring extends from the first face of the connector body through the tube and into the recess portion of the cylinder. A mechanism [in communication with the piston] advances the piston within the cylinder which compresses the spring. The compressed spring is forced against the valve opening mechanism which opens the valve for the free flow of fluid therefrom.

BRIEF DESCRIPTION OF THE DRAWINGS

FIG. 2 is a side cut-away view of the connector;

FIG. 2A is a partial side view of an alternate embodiment of the connector; and

DETAILED DESCRIPTION OF THE PREFERRED EMBODIMENTS

Figure 1:
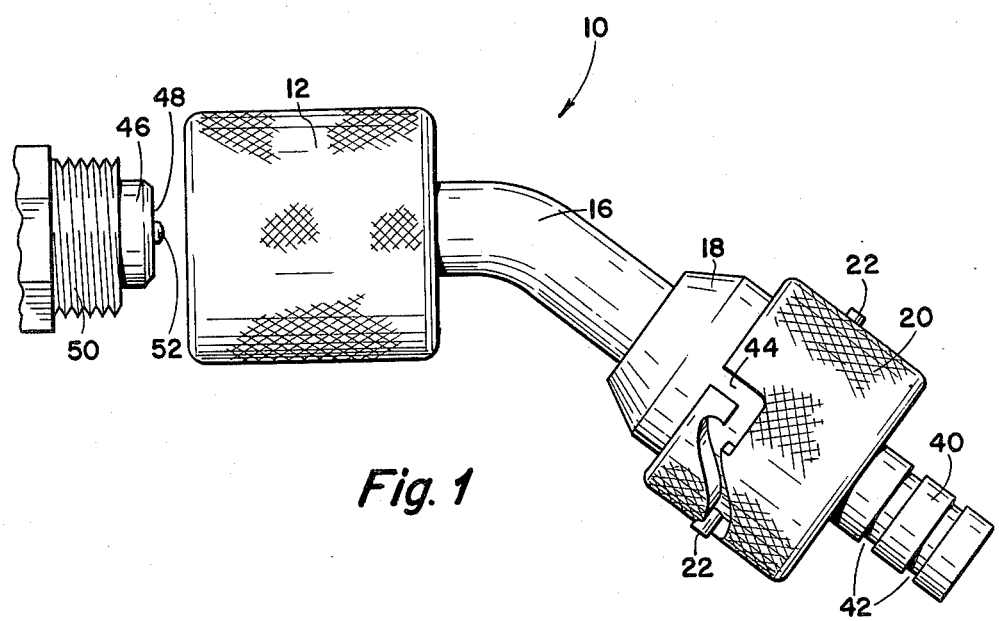
FIG. 1 is a side elevational view of a leakproof refrigerant connector embodying the present invention, with a Schroeder-type valve also shown.

Reference character 10 generally indicates a leakproof refrigerant connector specifically adapted to connect with a Schroeder-type core valve. As shown in FIGS. 1 and 2, the connector 10 is comprised of a knurled nut 12 which is spaced around a hollow connector 14 and is connected thereto to provide free rotation around the body 14. The connector body 14 is attached to a tubing 16, which is bent at approximately a 45° angle and a cylinder 18 is connected at the opposite end of the tubing 16. A knurled speed nut 20 is cooperable with prongs 22, which extend outwardly from the cylinder 18 180° apart from each other, and whose function will be described in more detail herein below.

The connector body 14 is provided with a central bore 15 extending axially therethrough and a circular rubber bushing 24 spaced within a recess 26 in the mouth of the connector body 14. The rubber bushing 24 extends a partial distance outward from the mouth of the connector body 14. An elongated spring 28 extends from the connector body 14, through the bore 15 and the tubing 16 and into the cylinder 18. A cavity 30 is centrally spaced within the cylinder 18 and a pyramid shaped coiled end 32 of the spring 28 is spaced within the cavity 30 to prevent the spring 28 from being removed from the connector 10.

A piston 34, with a bore 36 centrally extending therethrough, is adapted to slide within the cavity 30 and is provided with a plurality of "o"-rings 38 around the circumference of the piston 34 so as to provide a leakproof seal around the edges thereof. A lower shaft 40 of the piston 34 is of a smaller diameter and extends outwardly from the speed nut 20. Grooves or notches 42 are circumferentially spaced around the end of the shaft 40 for interconnection with a refrigerant hose (not shown).

Figure 3:
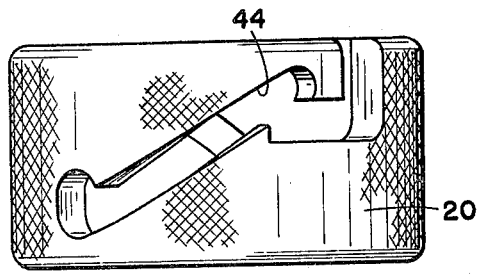
FIG. 3 is a front elevational view of a speed nut.

As shown in FIGS. 2 and 3, a bayonet-type connection is made with the prongs 22 and the speed nut 20. Two sloping recesses 44 are spaced within the speed nut 20 at 180° spacing. When the speed nut 20 is rotated clockwise, the prongs 22 draw the speed nut 20 and the piston 34 forwards and compresses the spring end 32. When the speed nut 20 is rotated counterclockwise, the spring end 32 forces the piston 34 and the speed nut 20 rearward. An alternate embodiment of a connection means is shown in FIG. 2A. A threaded nut 20A is spaced around the cylinder 18 and is cooperable with a threaded portion 21 of the cylinder 18. As can be seen, when the nut 20A is rotated clockwise the piston 34 is advanced and compresses the spring end 32 to open the valve 46.

A Schroeder-type core valve 46 is provided with a front face 48, a threaded body 50 and a centrally spaced operating element 52, which when depressed allows the passage of fluid therethrough. When a connection is to be made, the valve 48 is brought into contact with the nut 12. Threads 54 within the interior of the nut 12 cooperate with the threaded body 50 thereby bringing the front face 48 of the valve 46 into contact with the bushing 24 to form a leakproof seal. The spring 28 within the body 14 abuts against the operating element 54, but does not open the valve 46. The speed nut 20 is then rotated clockwise which causes the piston 40 to be drawn into the cavity 30 thereby compressing the end 32 of the spring 28. The spring 28 is forced against the operating elements 52 and opens the valve 45 for the flow of fluid through the tubing 16 and outward through the bore 36 in the piston 34 and shaft 40. As can be seen, when the valve 46 is connected to the connector 10, the valve 46 is not opened until after a leakproof seal is formed which prevents the leakage of refrigerant into the atmosphere and onto the hands of the serviceman.

When the valve 46 is to be closed, the speed nut 20 is rotated counterclockwise which allows the fluid pressure and the spring end 22 acting upon the piston 34 to force the piston 34 rearward. The spring 28 retracts from against the operating element 54 which closes the valve 46 and the flow of fluid. At this point, the valve 46 is closed and the hose (not shown) is full of refrigerant fluids. The high pressure gauge (not shown) is opened, then the low pressure gauge (not shown) is opened allowing the fluids to return to the system. In this manner, only the refrigerant contained within the low pressure side hose will be lost into the atmosphere.

The connector 10 provides an inexpensive means to open a Schroeder-type core valve without the extensive loss of refrigerant fluid and without the potential of freezing the hands of the serviceman.

Whereas the present invention has been described in particular relation to the drawings attached thereto, it should be understood that other and further modifications of the invention, apart from those shown or suggested herein, may be made within the scope and spirit of this invention.

What is claimed is:

1. A coupling for safely opening a normally closed Schrader-type valve which is connected to the refrigerant fluid of a compressor-type air conditioning system, the valve having a valve stem, the coupling comprising:
   a first connector body a first end of which is attachable to the exterior of said valve, a second end including an opening therein;
   a conduit retained at one end by said first connector body and sealed to said valve, and extending outwardly through said second end opening at an angle off-set from the axis of said opening, the other end of said conduit including an enlarged portion, said enlarged portion including a cylinder space which is in communication with said conduit;
   a piston, having a bore axially therethrough in communication with said cylinder space and said conduit, said piston sealably reciprocable within said cylinder;
   a second connector body interconnected with said enlarged portion of said conduit and retaining said piston in said cylinder;
   an elongated resilient conduit like member extending from the end of said piston in said cylinder through said conduit into contiguous relationship to the valve stem; and
   means to advance said piston against said resilient member, thereby forcing said member against said stem to open said valve.

2. A coupling of claim 1, wherein said means to advance said piston is said second connector body.

3. The coupling of claim 1 wherein said elongated resilient member is a coil spring of diameter sufficient to contact said valve stem.

4. The coupling of claim 1 wherein said seal of said conduit includes a recess portion in said one end within which a rubber bushing is positioned coaxially with said resilient member for sealable connection to the valve.

* * * * *